United States Patent [19]

Hirosawa et al.

[11] Patent Number: 5,202,989
[45] Date of Patent: Apr. 13, 1993

[54] CONTROL METHOD AND APPARATUS FOR COMPUTER NETWORK SYSTEM

[75] Inventors: Toshio Hirosawa, Machida; Jun'ichi Kurihara, Takamatsu; Ikuo Kimura, Yamato, all of Japan

[73] Assignee: Hitachi, Ltd., Tokyo, Japan

[21] Appl. No.: 539,750

[22] Filed: Jun. 18, 1990

[30] Foreign Application Priority Data

Jun. 23, 1989 [JP] Japan ................................ 1-159520

[51] Int. Cl.$^5$ ............................................. G06F 15/21
[52] U.S. Cl. ..................................... 395/650; 395/725
[58] Field of Search ................................. 395/650, 725

[56] References Cited

U.S. PATENT DOCUMENTS 4,839,798  6/1989  Eguchi ................................ 395/650
5,031,089  7/1991  Liu ..................................... 395/725

FOREIGN PATENT DOCUMENTS 63-58568  3/1988  Japan .

OTHER PUBLICATIONS

R. A. Donnan, et al., "Synchronous Data Line Control: A Perspective", IBM System Journal No. 2, 1974, pp. 140–163.

Primary Examiner—Emanuel S. Kemeny
Attorney, Agent, or Firm—Fay, Sharpe, Beall, Fagan, Minnich & McKee

[57] ABSTRACT

In a computer network system in which a plurality of computer systems managed by different managers are connected, each computer system in the network system is provided with a group of tables for storing the characteristics of computer systems in the network system with which the site of that computer system is communicatable, the cumulative total of account information when that computer system requested the execution of jobs to another site, the cumulative total of account information when the site of that computer system executed jobs requested from another site, and the calculated value of the balance of accounts between the site of that computer system and each site in correspondence to each of sites in the network system and is also provided with a group of processing programs. When the site of that computer system requests the execution of a job to one of the other sites, the site of that computer system examines the calculated value of the balance of accounts between the site of that computer system and each of the other sites so that a site to which the execution of the job is to be requested is selected on the basis of the balance of accounts between the site of that computer system and the other site.

29 Claims, 14 Drawing Sheets

FIG. 3

| FLAG 'F' | REFERENCE SITE NAME | REQUESTER SITE NAME | CONTENTS OF REQUEST ||||
|---|---|---|---|---|---|---|
| | | | KIND OF MACHINE | CPUT | FILE CAPACITY | TAT |
| 25A | 25B | 25C | 25D1 | 25D2 | 25D3 | 25D4 |

| FLAG 'E' | ANSWER SITE NAME | REQUESTER SITE NAME | REASON INFORMATION ||||
|---|---|---|---|---|---|---|
| | | | TAT | CPUT | FILE | ... |
| 26A | 26B | 26C | 26D1 | 26D2 | 26D3 | |

| FLAG 'Q' | ANSWER SITE NAME | REQUESTER SITE NAME | REASON INFORMATION ||||
|---|---|---|---|---|---|---|
| | | | TAT | CPUT | FILE | ... |
| 27A | 27B | 27C | 27D1 | 27D2 | 27D3 | |

| FLAG '3' | PERTINENT SITES | | SEND JOB ACCOUNT INFORMATION | | | | | | RECEIVE JOB ACCOUNT INFORMATION | | | | | |
|---|---|---|---|---|---|---|---|---|---|---|---|---|---|---|
| | RECEIVER | SENDER | NUMBER OF JOBS | CPUT | IOC | LPC | FS | ACCOUNT | NUMBER OF JOBS | CPUT -R | IOC -R | LPC -R | FS -R | ACCOUNT -R |
| 31A | 31BR | 31BS | 31C1 | 31C2 | 31C3 | 31C4 | 31C5 | 31C6 | 31D1 | 31D2 | 31D3 | 31D4 | 31D5 | 31D6 |

31, 31B, 31C, 31D

CONTROL METHOD AND APPARATUS FOR COMPUTER NETWORK SYSTEM

BACKGROUND OF THE INVENTION

The present invention relates to a control method and apparatus for a computer network system including a plurality of computer system managed by different managers, in which the rents (or accounts) associated with the execution of jobs in the computer network system are transferred to computer system sites in the computer network system, and more particularly to a control method and apparatus which are suitable in view of processing capacity, function and rent in the case where a user contracting to use a specified computer system site utilizes computer systems of sites in the computer network system other than the specified site.

With the extent of the field of applications of an information processing system or electronic computer, the range of utilization of the electronic computer system is expanding to image processing, use of data base, on-line processing, non-numerical processing, and so on in addition to the mere calculative processing which has hitherto been performed. Corresponding to this, the running of the information processing system (hereinafter referred to as computer system) is getting to include a 24-hour running service and the distribution of processing and/or function associated with the utilization of a computer network system. As one method of supporting the 24-hour running service of the computer system, JP-B-61-6426 has disclosed a control system in which the operating conditions of computer systems structuring a network are mutually monitored by each other in order to allow the unmanned running of computer systems. According to the technique disclosed by the JP-B-61-6426, the starting and stopping of computer systems in the network system are made by means of public lines under monitoring by a disaster prevention monitoring panel the conditions of the computer systems after the starting thereof are mutually monitored by the computer systems by means of data transmission lines between the computer systems.

On the other hand, the effects of function distribution by a computer network, methods of utilization of communication paths and network structuring methods have been applied to many fields since they were disclosed by the article "Synchronous data link control: A perspective", IBM System Journal No. 2, (1974) pp. 140–163.

Also, JP-A-63-58568 has disclosed a control system in a network structure formed by a host computer and distributed computers or more particularly a control system which makes it possible for the central host computer to monitor the conditions of execution of jobs at the distributed computers. According to the technique disclosed by the JP-A-63-58568, only necessary information among information concerning the execution of processings by the distributed computers is transmitted as advising information together with a change in the condition of execution to the host computer.

SUMMARY OF THE INVENTION

The above prior art provides ways for the labor saving of the running of computer systems in a network system and the reduction of the rent of communication lines. However, the use of the above technique indispensably requires that the computer systems forming the network system should be under management of the same administrator or the same operation manager.

As the field of applications of a computer system expands, an enterprise making an information providing service as a main business desires the procession of a faculty for always providing a constant service to users which contracted to use computer systems of that enterprise. For example, such a faculty includes a capacity to cope with the user's request for use even for a demand exceeding the processing capacity of a group of computer systems processed by that enterprise. A coping method in such a case is the utilization of a computer network system. Namely, in accordance with the user's demand, for example, a request for the completion of a job within a predetermined time, a request for execution of the job can be made to an optimal computer system of the network system which is managed by another administrator. A problem to be solved in this case is how to transfer an account associated with the use of the computer system. In general, the unit price of rent of computer system is different between individual sites or computer systems. (Hereinafter, the unit of a computer system will sometimes be called a site.) On the other hand, even if the computer actually utilized by the user is a computer of a site other than a site with which the user is under contract, it is preferable on the user's standpoint that he can make payment based on the unit price of rent for a computer system of the site with which the user is under contract and he pays the account into the site with which the user is under contract. Namely, even if it becomes possible to transfer a job to another site by use of a computer network in order to satisfy the user's request, the accounting associated with the execution of the job is left as a problem to be solved.

A method of selecting an optimal one of computer system sites connected to the computer network system is also left as a problem to be solved. Namely, if there is employed a method in which a user directly designates the site of a computer system which is to executes his desired job, the user should be conscious of the feature of each of the computer systems connected to the computer network system.

Accordingly, an object of the present invention is to provide a control method and apparatus, for a computer network system in which a plurality of computer systems managed by different managers are connected, wherein when any given one of computer system sites executes a job requested by another site, the given site can deliver account information as well as the result of execution of the job to the other site and the other site can cast (or balance) accounts inclusive of the demanding accounts when the other site itself previously received the execution of jobs requested by the given site.

Another object of the present invention is to provide a control method and apparatus, for a computer network system in which a plurality of computer systems managed by different managers are connected, wherein even if a job requested by a user under contract with a certain site is executed by another site, the rent of a computer can be demanded to the user in accordance with the standard for accounts at the site with which the user is under contract.

A further object of the present invention is to provide a control method and apparatus, for a computer network system in which a plurality of computer systems managed by different managers are connected, wherein when a request for the execution of a job from a certain user is received, the execution of the job is preferentially requested to a site which has an unfavorable balance of accounts for debit and credit between that site and another site associated with the exchange of jobs previously made between both the sites.

To attain the above objects, in a control method and apparatus for a computer network system according to the present invention, each of computer system sites in the network system is provided with a group of tables for storing the characteristics of the computer systems of sites with which that site is communicable, the cumulative total concerning account information when that site requested the execution of jobs to another site, the cumulative total concerning account information when that site executed jobs requested from another site, and the calculated value of the. balance of accounts between that site and each site and is also provided with a group of processing programs. Each computer system site is further provided with a user account table for storing account information for each of users which are under contract with that site. In this user account table is also registered account information concerning each of representative users of sites other than that site.

The effects of the control method and apparatus for a computer network system according to the present invention are demonstrated, for example, when the execution of a job requested by a user making a contract with a certain given site to use a computer system of the given site will be not finished by a processing service of the computer system of the given site itself within a time expected by the user.

First, the given site with which the user is under contract examines the calculated value of the balance of accounts between the given site and each of sites other than the given site to select a site which has the worst balance relative to the given site. Next, a message of "request for job execution" is delivered to the selected site in order to examine whether or not has the selected site is capable of conducting the execution of the requested job. If a response message informing of "non-acceptance of receive" is returned from the selected site, the given site selects a site having the next worst balance and the above processing is repeated.

If a response message informing of "acceptance of receive" is returned from the selected site, the given site transfers a data stream of account information storage area together with a job control language, a program and data to a computer system of the selected site.

The site receiving the execution of the job executes the job with identification information of the job execution requesting site or representative user identification information of the requesting site being used as user identification information at the job execution receiving site and returns account information together with the result of execution of the job to the requesting site. This account information concerns the quantities of use of computer resources and includes the time of use of central processing unit (CPU), the number of times of use of input/output device and the amount of use of file capacity. It is of course that the above account information is stored as receive job account information in the computer system of the receiving site.

Upon reception of the above account information together with the result of execution of the job, the requesting site stores once the account information into "send job account table" in its own computer system and determines the total of expenses associated with the result of the job by use of the unit price for each processing stored in the send job account table. The requesting site uses the determined total of expenses to cast or balance accounts between the requesting site and the receiving site and stores the result of calculation. On the basis of the stored value of the result of calculation, a processing for the settlement of accounts is performed for every constant period at each site.

At the requesting site, a processing for demand for the rent of computer to the user under contract with the requesting site itself is performed by use of the unit price at the requesting site. Namely, a processing for demand for the rent of computer by the above acquired account information multiplied by the unit price at the requesting site is performed.

In this manner, the control method and apparatus for computer network system according to the present invention eliminate the problem of the difference in unit prise for accounts between sites and allow users of computer systems to enjoy a service for utilization of a computer network.

A mechanism for realizing the computer network system control method and apparatus according to the present invention operates in a form added to an operating system and a job management program and has an allotted task including a processing for reception of a job group (also referred to as job stream), a processing for delivery of a job group and a processing for accounts. Accordingly, when a job group is transferred or sent to any given site from another site, a computer system of the given site (or receiver site) is used by means of representative user identification information of the other site (or sender site) which is registered in the computer system of the receiver site. Accordingly, after reception of the job, a processing similar to a job execution processing at the receiver site is performed under control of the known operating system and job control program. After the execution of the job has been finished, the reference to an execution result output file (also referred to as spool file) in which the result of execution of the job is stored is made to fetch the result of executing of the job requested from the sender site and the fetched result with account information added thereto is delivered to the sender site. Also in a computer system of the job execution requesting site (or sender site), a mechanism for realizing the computer network system control method and apparatus according to the present invention operates in a form added to an operating system and a job management program and has an alloted task including a processing for selection of optimal site, a processing for job request, a processing for reception of the result of execution and a processing for settlement of accounts. Accordingly, it is not necessary to reconstruct the known or existing operating system and hence there is no erroneous operation which may be caused from the reconstruction.

BRIEF DESCRIPTION OF THE DRAWINGS

FIG. 3 shows the format of a data stream for inquiry about a request for job execution;

FIG. 4A shows the format of a data stream for response of non-acceptance of receive;

FIG. 4B shows the format of a data stream for response of acceptance of receive;

FIG. 8 shows the format of a data stream when the result of settlement of accounts between sites is exchanged between the sites;

DESCRIPTION OF THE PREFERRED EMBODIMENTS

As embodiment of the present invention will now be explained by virtue of FIGS. 1 to 17.

Figure 1:
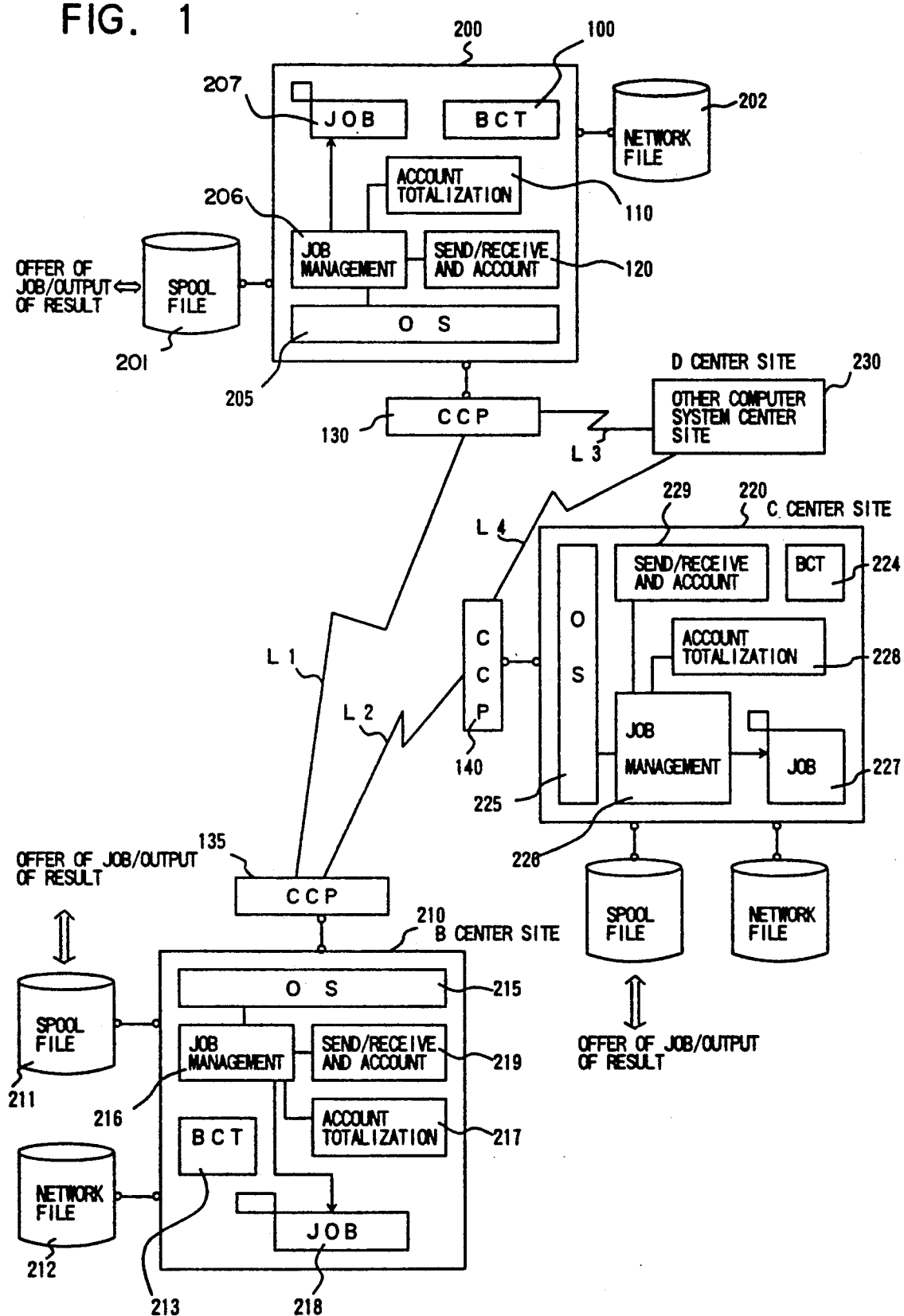
FIG. 1 is a diagram showing the construction of a system to which a control method for computer network system according to the present invention is applied.

FIG. 1 is a diagram showing the construction of a system to which a control method for computer network system according to the present invention is applied. In FIG. 1, reference numerals 200, 210 and 220 designate computer syssterns of individual sites under which operating systems 205, 215 and 225, job management programs 206, 216 and 226, and application programs 207, 218 and 227 operate. The application programs 207, 218 and 227 are user's jobs and hereinafter the application program will be referred to as job.

A group of processing programs and a group of control tables for realizing the control method for computer network system according to the present invention include send/receive and account processing programs 120, 219 and 229, account totalization processing programs 110, 217 and 228 and network account tables or budget control tables (BCT's) 100, 213 and 224 and operate in cooperation with the job management programs 206, 216 and 226. In FIG. 1, the sites of the computer systems 200, 210, 200 and 230 are termed A, B, C and D center sites, respectively. The A, B, C and D center sites 200, 210, 220 and 230 are connected through communication control processors (CCP's) 130, 135 and 140 and lines L1, L2, L3 and L4. Though a CCP for the D center site 230 is not shown, it is of course that the CCP for the D center site 230 is actually provided. Also, a group of processing programs and a group of control tables for realizing the control method for computer network system according to the present invention as in the A, B and C center sites 200, 210 and 220 are not shown in the D center site 230 but the D center site 230 is actually provided with such a processing program group and a control table group or constituent elements for providing the function of the present invention. The following explanation will be mainly made in conjunction with the construction and operation of the A center site 200 but the reference will be made to the operations of the B and C center sites 210 and 220, as required.

In FIG. 1, reference numeral 201 designates a spool file and numeral 202 designates a network file. When a user makes the offer of a request for the execution of a job together with a job control language, a program stream and a data stream (hereinafter also referred to as job stream) to the A center site 200, those data are once stored into the spool file 201 by the job management program 206 of the operating system (OS) 205 and the send/receive and account processing program 120 for working. The spool file 201 is also used for storage of output data of the result of job execution. The network file 202 is used as an auxiliary storage area of the budget control table (BCT) 100 (see FIG. 2) and information of accounts between sites in the network system is stored in the network file 202.

After the user has made the offer of the job execution request to the A center site 200 and the job management program 206 has received the relevant job, control is transferred or entrusted to the send/receive and account processing program 120 according to the present invention. The send/receive and account processing program 120 examines whether or not the computer system of its own center site (or the A center site) is capable of processing the relevant job. If the computer system of the A center site can process the relevant job, the control is returned to the job management program 206 in order that the job stream is stored into the spool file 201. After the job stream has been stored into the spool file 201 by the job management program 206, the stored job stream is taken out of the spool file 201 when the relevant job is executed under control of the OS 205 in the computer system of the A center site itself.

On the other hand, if the computer system of the A center site itself is crowded so that it is difficult to process the requested job within a time expected by the user, the send/receive and account processing program 120 according to the present invention tries to execute the relevant job at one of other center sites in the network system. First, the send/receive and account processing program 120 examines the budget control table (BCT) 100 to compare the balances of accounts for debit and credit between the A center site and the other center sites, thereby selecting one of the other center sites which has the worst balance relative to the A center site. Next, the send/receive and account processing program 120 inquires of the selected site about a request for job execution. If a response of non-acceptance of receive is returned as the result of inquiry, a center site having the next worst balance is selected and the above processing is repeated. If the response of non-acceptance of receive is returned from all of the other center sites, the A center site makes its own computer system execute the relevant job. In this case, the control is returned to the job management program 206.

If a response of acceptance of receive is returned from the selected center site, the send/receive and account processing program 120 sends the job stream of the relevant job with account information area added thereto through the line L1 or L2 to the selected center site. The format of a data stream on the lines L1 to L4 will be explained in later by virtue of FIGS. 3 to 8. In the case where the job execution receiving site is the B center site 210 in the example shown in FIG. 1, the send/receive and account processing program 219 of the B center site 210 adds representative user identification information of the A center site 200 to the job stream sent from the A center site 200 and the control is transferred to the job management program 216. The job management program 216 causes the job stream to be stored into a spool file 211 so as to allow the execution of the relevant job by the computer system of the B center site itself. In this manner, the job of the user of the A center site 200 is executed by the computer system 210 of the B center site 210.

Next, the job management program 216 in the computer system 210 of the B center site operates on the basis of a job execution schedule to take out the job stream from the spool file 211 and execute the job (or application program) 218 under control of the OS 215. After the execution of the job has been finished, the send/receive and account processing program 216 in the computer system 210 of the B center site causes account information to be stored into an account informaation area of the budget control table (BCT) 213 for the A center site 200. When the result of job execution is returned to the A center site, the send/receive processing program 216 delivers the result of job execution together with the account information concerning the relevant job.

Figure 2:
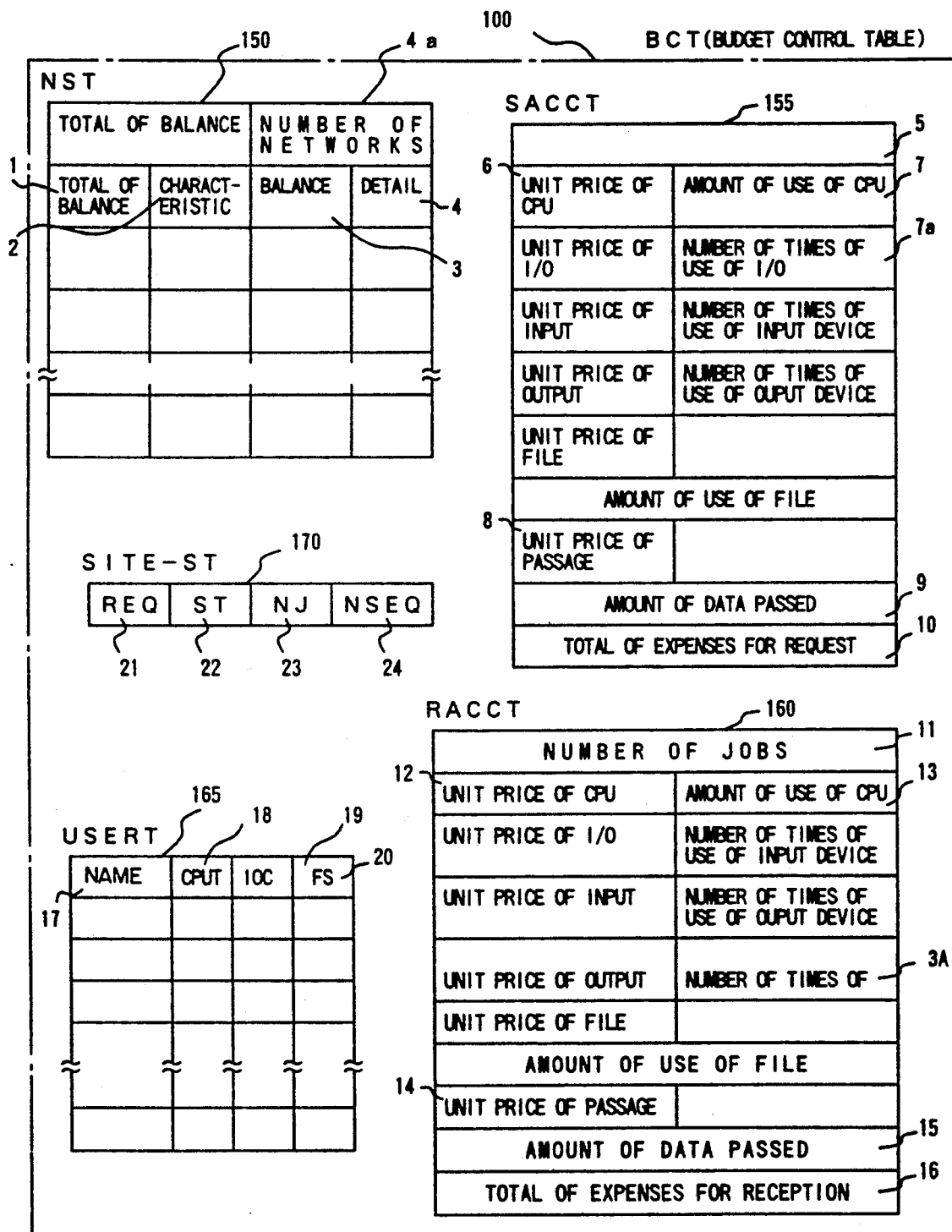
FIG. 2 shows the construction of a network account table or budget control table (BCT) 100 which includes a network statistical management table (NST) 150, a send job account table (SACCT) 155, a receive job account table (RACCT) 160, a user account table (USERT) 165 and a site status table (SITE-ST) 170.

Upon return of the result of execution of the relevant job and the account information into the A center site 200 through the line L1, the send/receive and account processing program 120 in the computer system 200 of the A center site causes the account information to be stored into a send job account table in the budget control table (BCT) 100 associated with (or in correspondence to) the B center site. The above-mentioned account information includes the time of use of central processing unit (CPU), the number of times of input-/output into/from input/output device and a frequency such as the amount of use of file capacity. Next, the account information is stored together with the representative user identification information also into the user account table in the budget control table (BCT) 100. The construction of each of the send job account table (SACCT) and the user account table (USERT) is shown in FIG. 2 which will be explained later. Output information of the result of execution of the job is once stored into the spool file 201 by virtue of the job management program 206 and is thereafter taken out of the spool file 201 so that it is outputted to an output device such as a line printer (not shown) and is delivered to the user.

The account totalization processing program 110 operates cast accounts for debit and credit between the A center site and each of other center sites for every constant period, for example, at every month-end. The account totalization processing program 110 refers to the budget control table (BCT) 100 to perform a processing for the settlement of accounts between its own center site (or the A center site 200) and another center site (for example, the B center site 210). If the result of the settlement processing shows that the balance of the A center site relative to the other center site is minus, the account totalization processing programs 110 performs a processing for the payment of the difference (or the balance due) to the other center site.

In the computer network system, when a request for the execution of a job is made from the A center site 200 to the B center site 210 through another center site(s), for example, through the line L3, the D center site 230, the line L4, the C center site 220 and the line L2, each of the relaying center sites is provided with processing means which allows a demand for an account for relay to the A center site 200. Since the A center cite 200 delivers a data stream for account information area together with a data stream for job on the line L3, each of the relaying center sites establishes as the relay account the value of an account associated with the relay of data to the account information area. Such a relay account processing means may be provided in each of sites in the network system.

Figure 5:
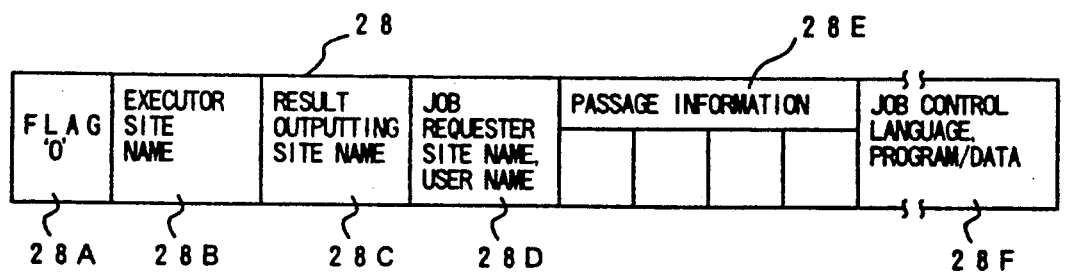
FIG. 5 shows the format of a data stream upon request for job execution.
Figure 6:
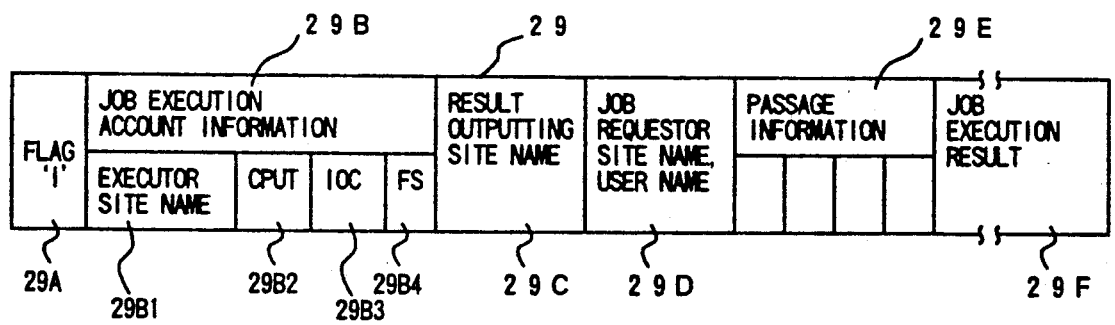
FIG. 6 shows the format of a data stream when the outputting of the result of job execution is requested to another site.
Figure 7:
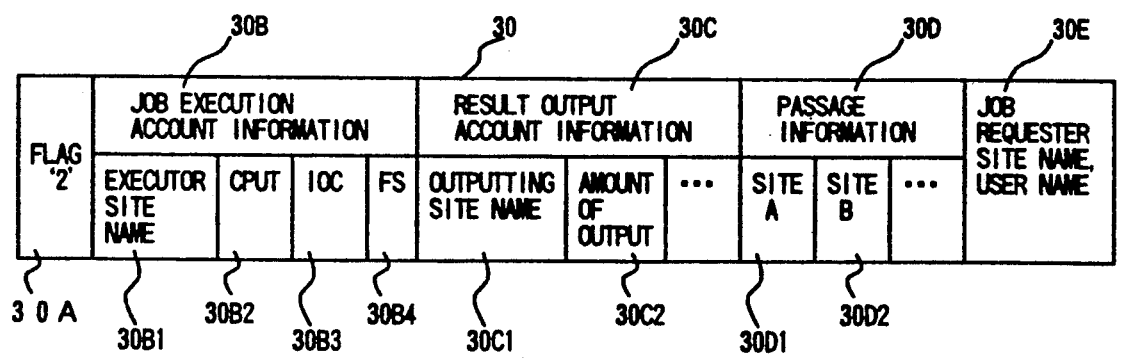
FIG. 7 shows the format of a data stream when account information is returned to a job execution requesting site.
Figure 17:
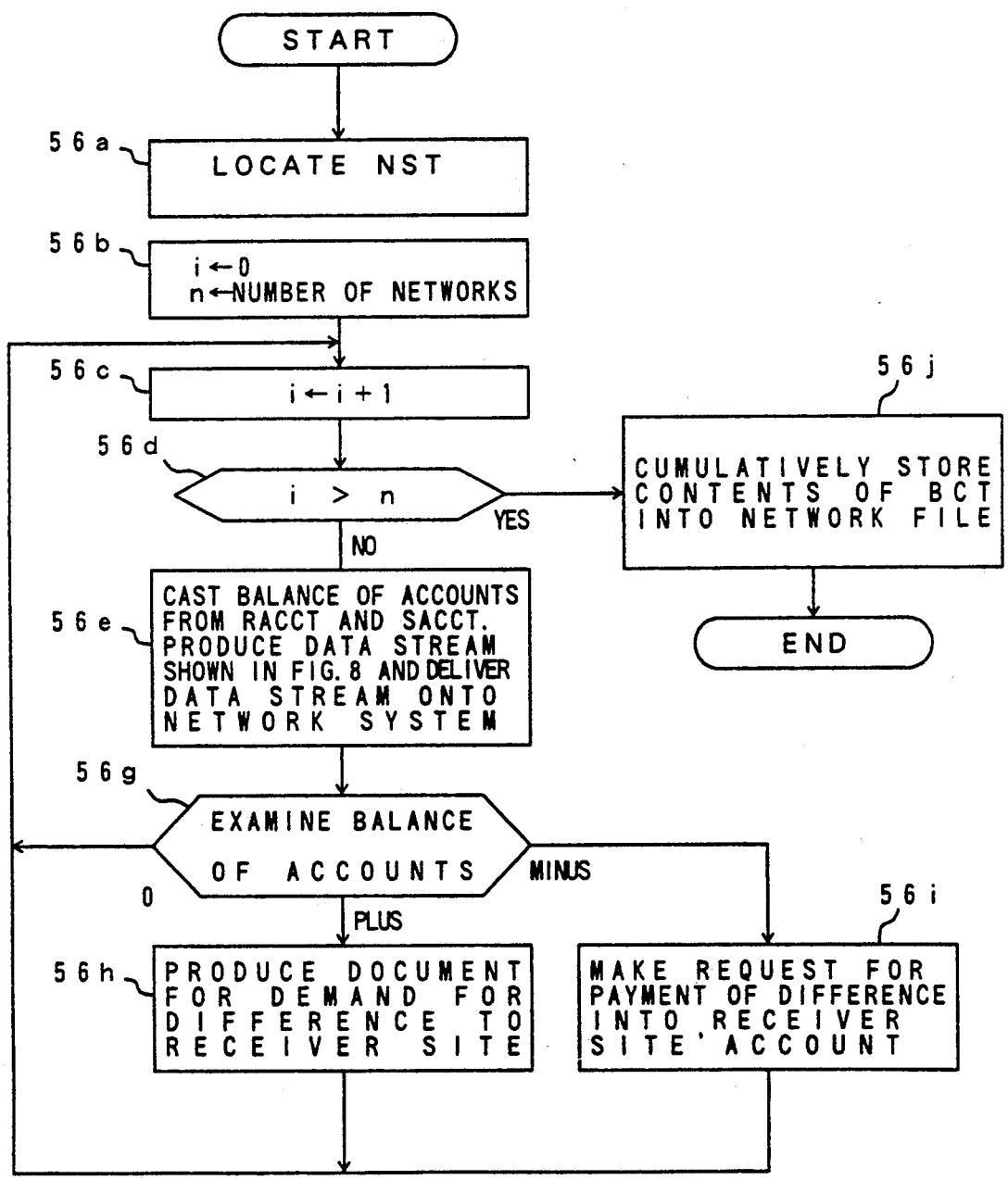
FIG. 17 is a flow chart of an account totalization processing 110 shown in FIG. 1.
Figure 18:
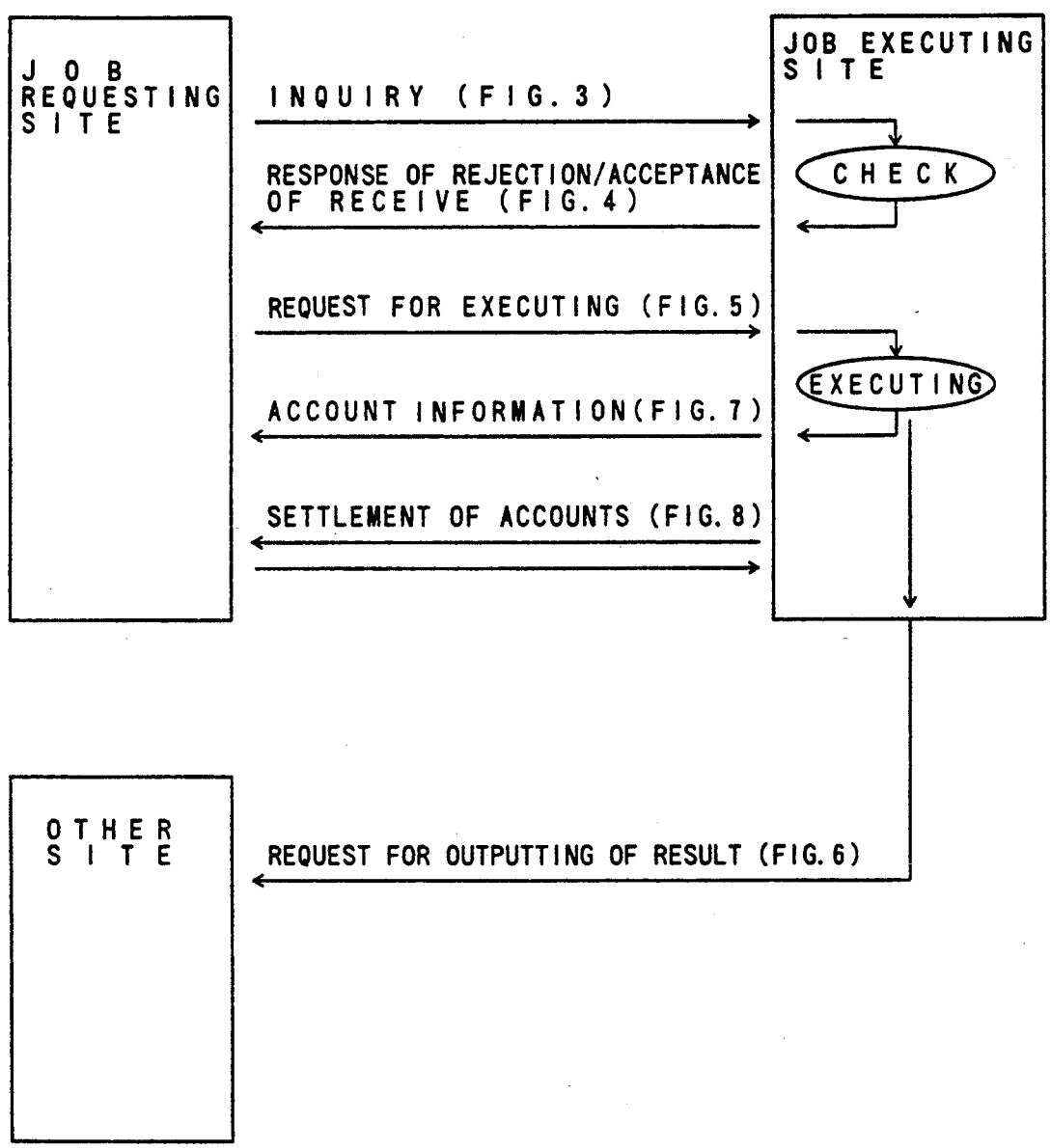
FIG. 18 is a diagram showing the flow of various data streams exchanged or transferred between center sites.
Figure 19:
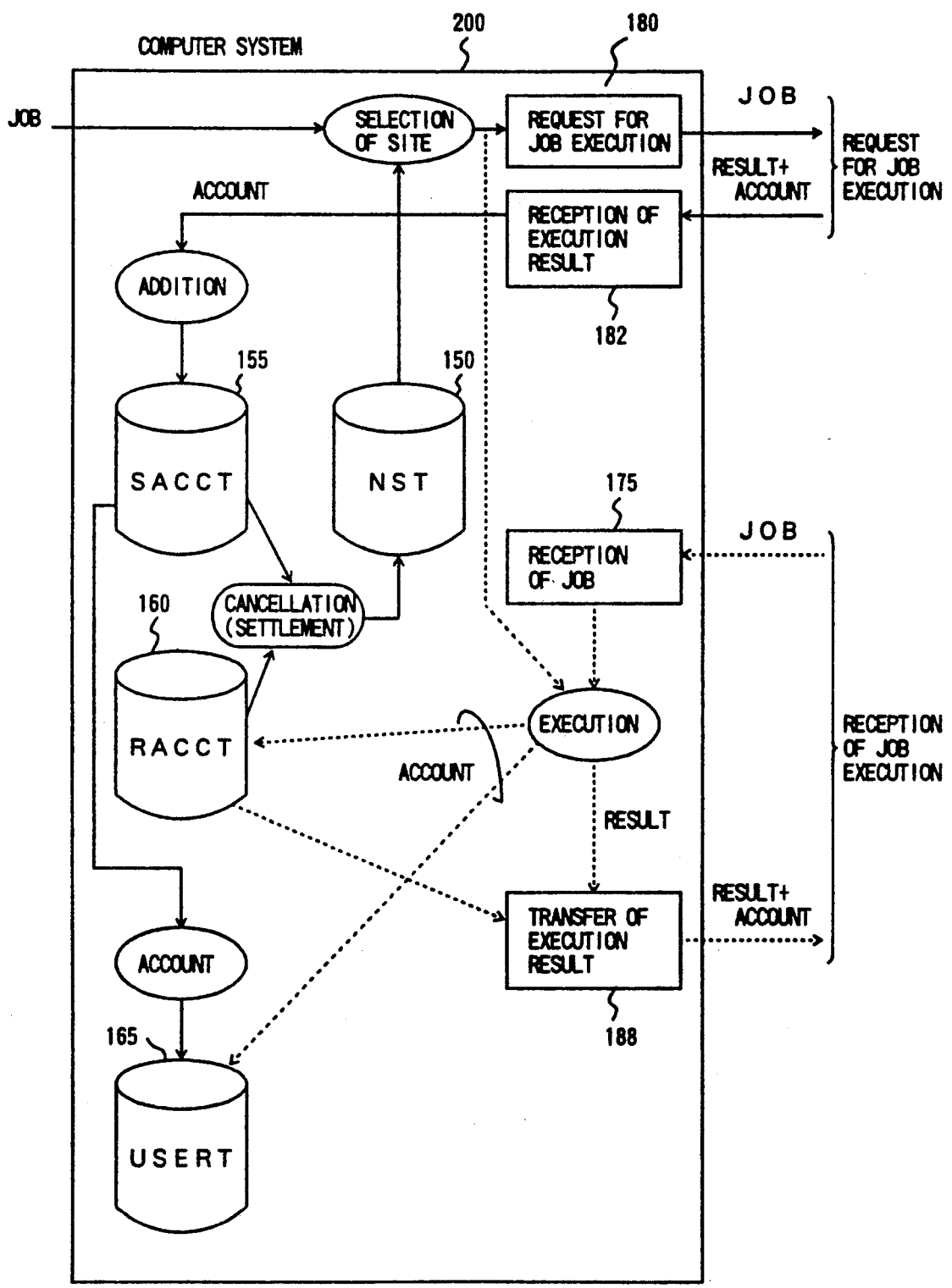
FIG. 19 is a diagram showing the outline of processings performed upon request for job execution and upon reception of job execution.

The above is the outline of the operation according to the control method for computer network system of the present invention. Next, the details of the operation will be explained by use of a diagram of FIG. 19 showing the outline of processings performed upon request for job execution and upon reception of job execution, and block diagrams and flow charts shown in FIGS. 2 to 18. FIG. 2 shows the construction of the budget control table (BCT) 100. The budget control table (BCT) 100 includes a network statistical management table (NST) 150, a send job account table (SACCT) 155, a receive job account table (RACCT) 160, a user account table (USERT) 165 and a site status table (SITE-ST) 170. FIG. 18 shows the various data streams which will be mentioned hereinafter and are transferred between sites. FIG. 3 shows an example of the format of a data stream for inquiry about a request for job execution. FIG. 4A shows an example of the format of a data stream for response of rejection or non-acceptance of receive and FIG. 4B shows an example of the format of a data stream for response of acceptance of receive. FIG. 5 shows an example of the format of a data stream upon request for job execution. FIG. 6 shows an example of the format of a data stream when the outputting of the result of job execution is requested to another site. FIG. 7 shows an example of the format of a data stream when account information is returned to a job execution requesting site after the outputting of the result of job execution has been finished. FIG. 8 shows an example of the format of a data stream when the result of settlement of accounts between sites is exchanged between the sites.

Figure 9:
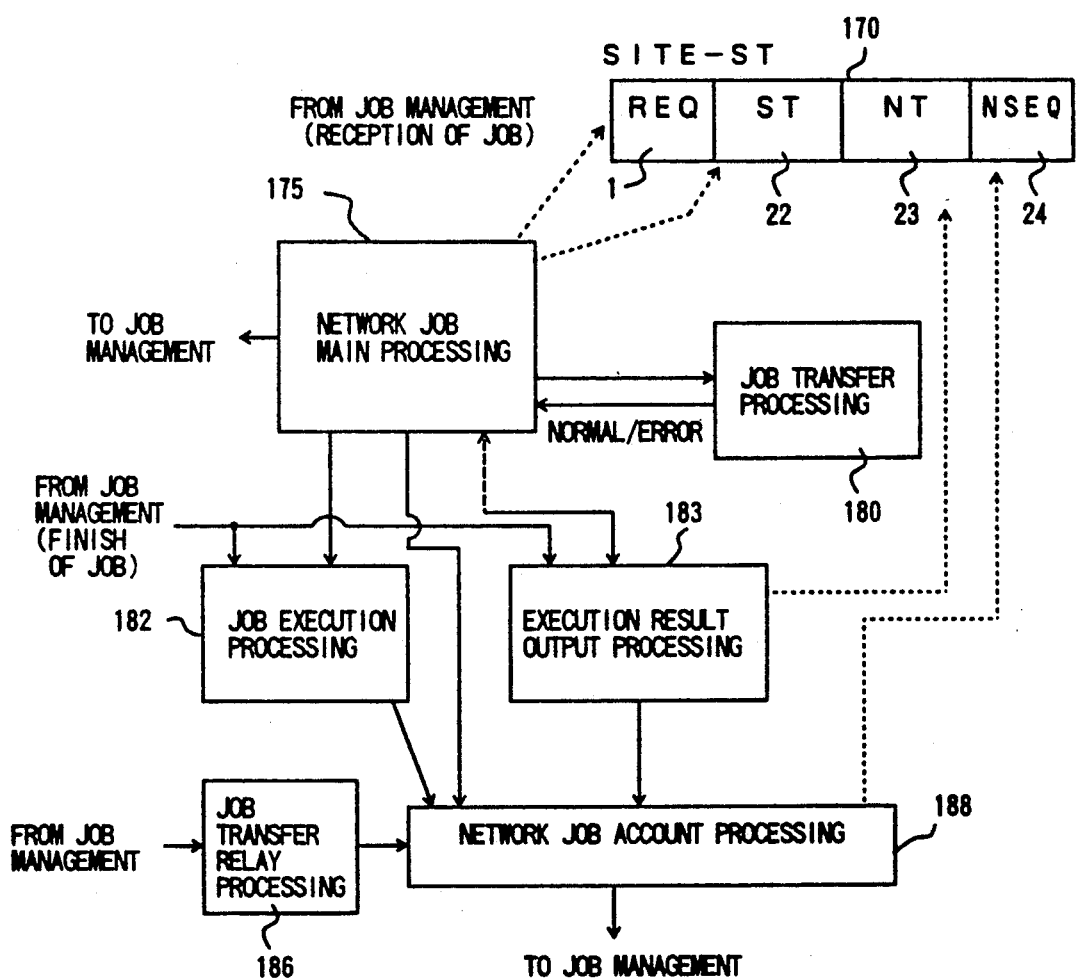
FIG. 9 is a diagram showing a program structure of a send/receive and account processing 120 shown in FIG. 1.
Figure 10:
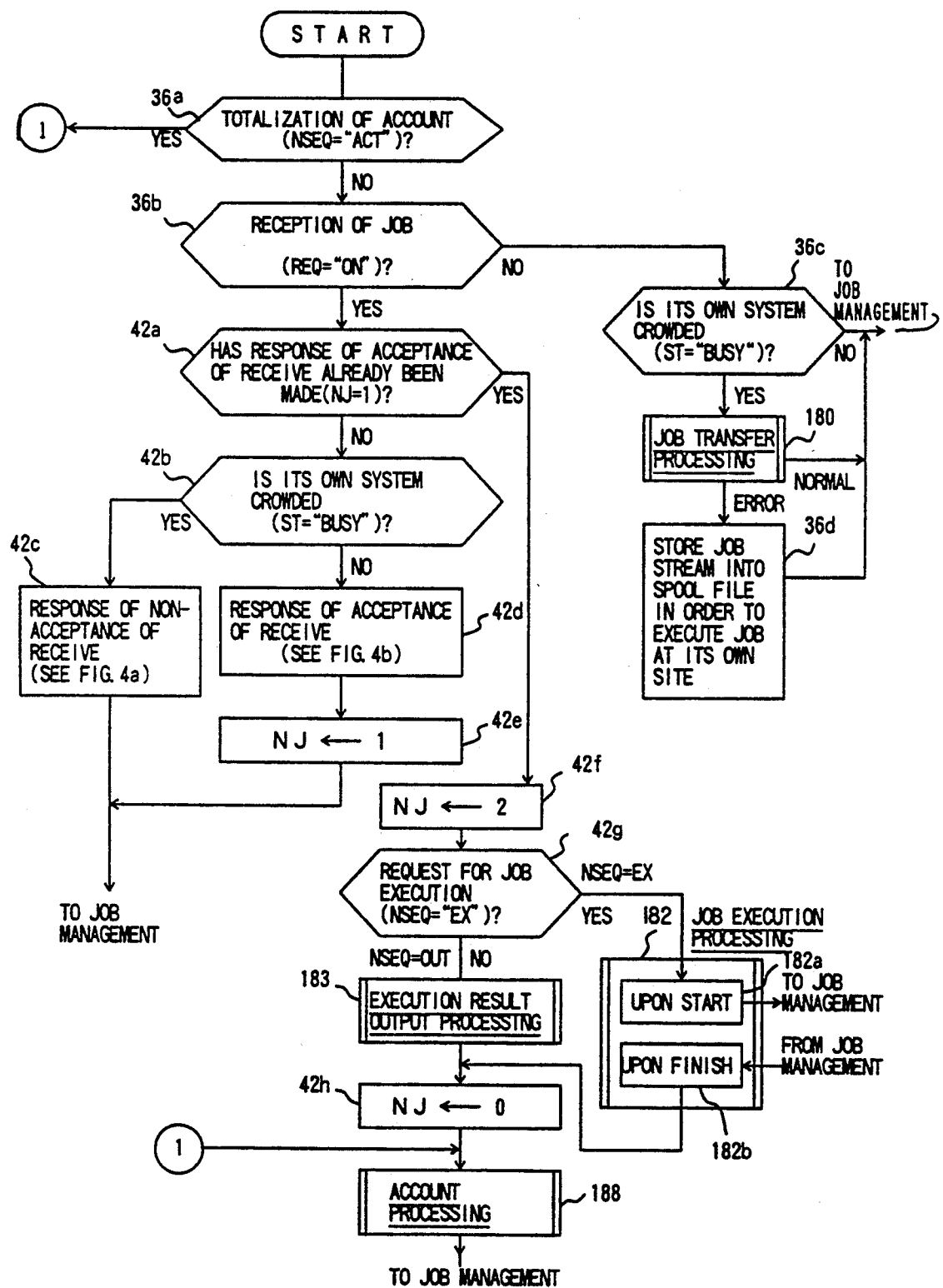
FIG. 10 is a flow chart of a network job main processing 175.
Figure 11:
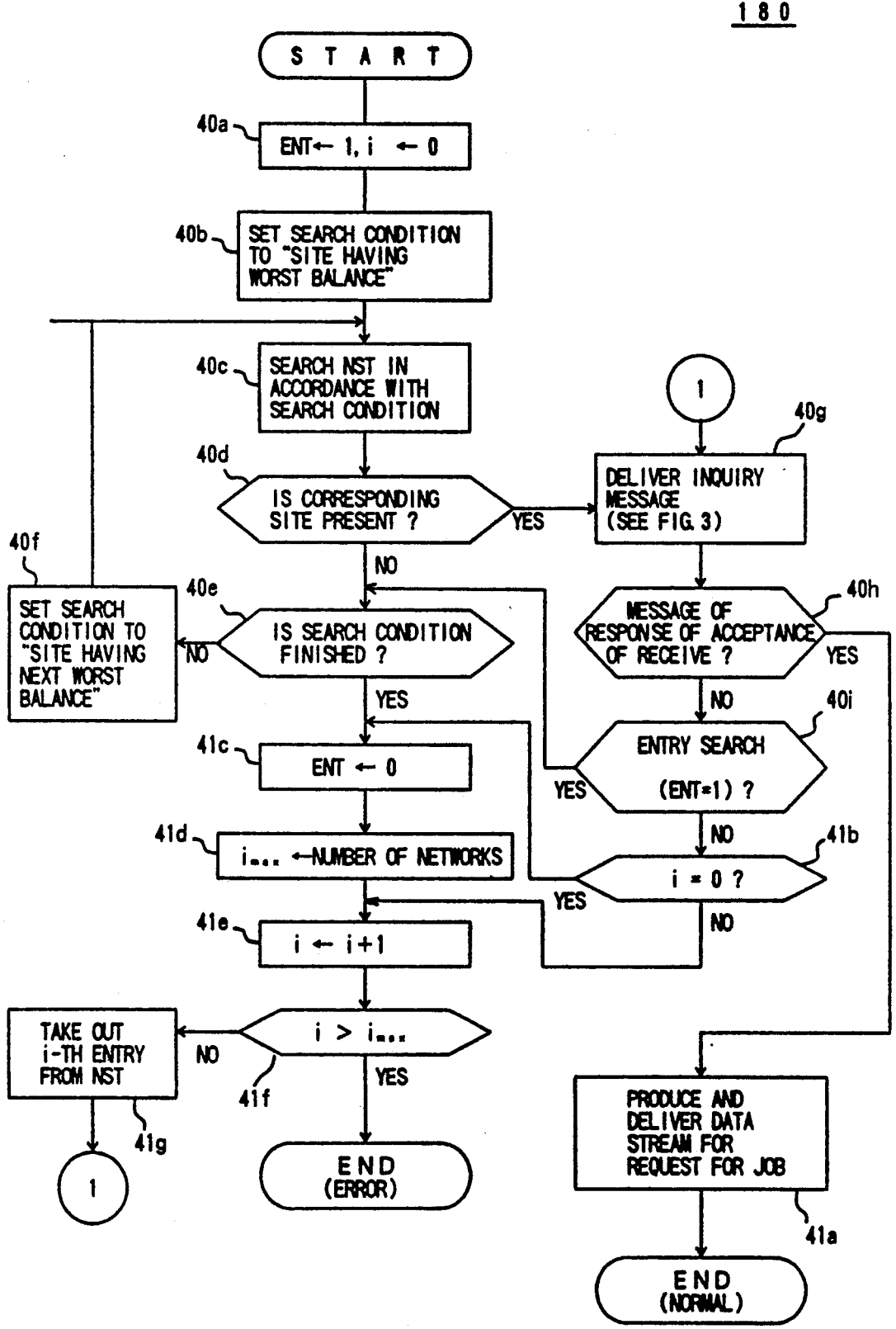
FIG. 11 is a flow chart of a job transfer processing 180.
Figure 12:
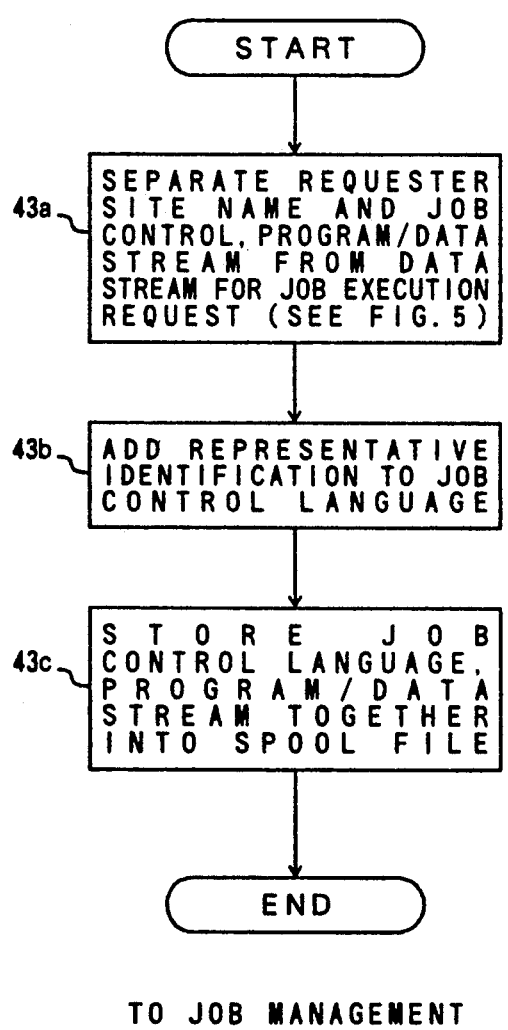
FIG. 12 is a flow chart of a portion of a job execution processing 182 performed for the start of job execution.
Figure 13:
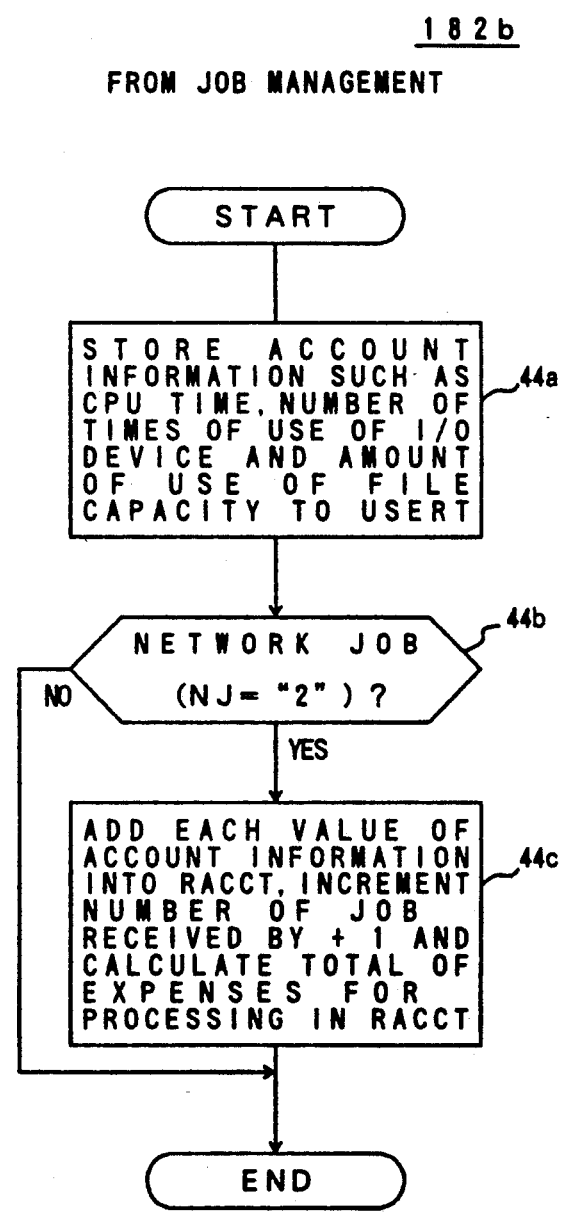
FIG. 13 is a flow chart of a portion of the job execution processing 182 performed upon finish of job execution.
Figure 14:
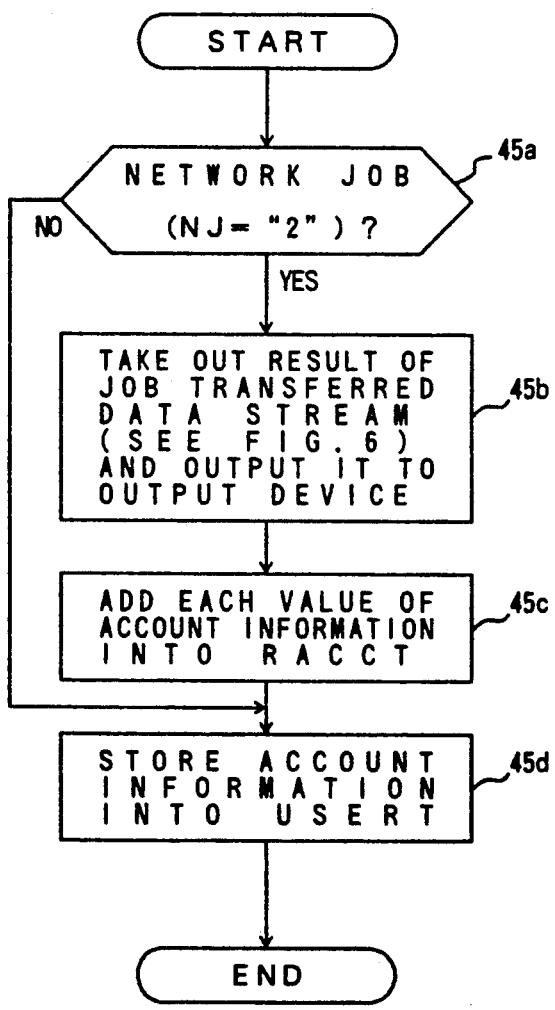
FIG. 14 is a flow chart of an execution result output processing 183.
Figure 15:
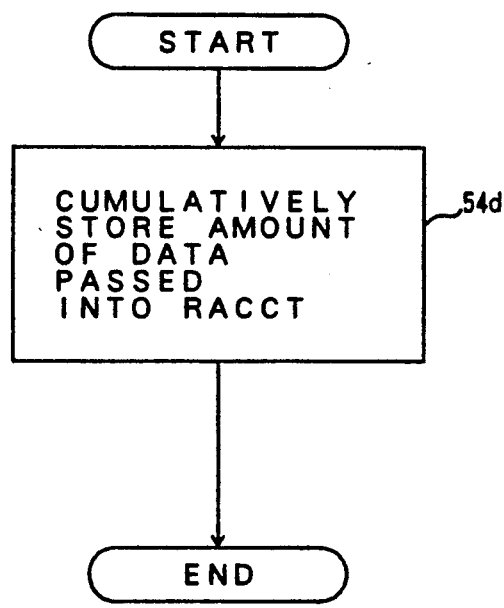
FIG. 15 is a flow chart of a job transfer relay processing 186.
Figure 16:
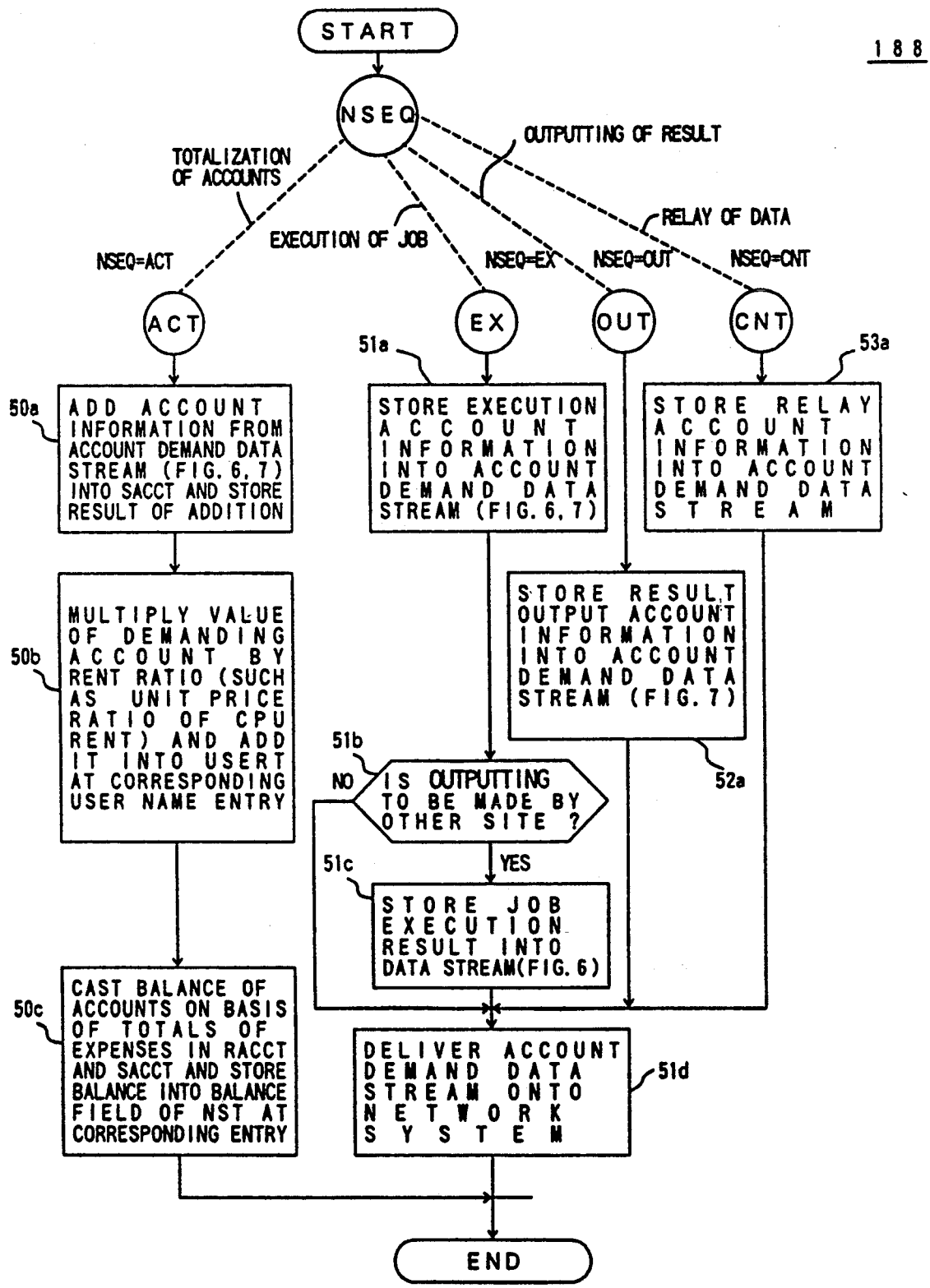
FIG. 16 is a flow chart of a network job account totalization processing shown in FIG. 9.

FIG. 9 is a block diagram of the send/receive and account processing program 120 shown in FIG. 1. The send/receive and account processing program 120 includes a network job main processing 175, a job transfer processing 180, a job execution processing 182, an execution result output processing 183, a job transfer relay processing 186 and a network job account processing 188. FIG. 10 is a flow chart of the network job main processing 175. FIG. 11 is a flow chart of the job transfer processing 180. FIG. 12 is a flow chart of a portion of the job execution processing 182 performed for the start of job execution and FIG. 13 is a flow chart of a portion of the job execution processing 182 performed upon finish of job execution. FIG. 14 is a flow chart of the execution result output processing 183. FIG. 15 is a flow chart of the job transfer relay processing 186. FIG. 16 is a flow chart of the network job account processing 188 shown in FIG. 9. FIG. 17 is a flow chart of the account totalization processing 110.

The network statistical management table (NST) 150 shown in FIG. 2 stores therein information of the balance for accounts between its own center site (hereinafter referred to as center site under consideration) and each of other center sites in the network system connected thereto and is composed of a site name field 1, a characteristic field 2, a balance field 3 and a pointer 4 to detail information area. The site name field 1 is also used as representative identification information of each center site. The characteristic field 2 holds therein the characteristics of a group of computers constructing the network, for example, the processing speeds of central processing units. The balance field 3 stores therein the result of settlement of accounts between the center site under consideration and a site corresponding to the entry. If the value of the balance field 3 is plus, the center site under consideration is at a profit. Accordingly, when the execution of a job is requested to another site, the request is selectively staring from a site associated with the balance field 3 the value of which is the greatest. The send job account table (SACCT) 155 and the receive job account table (RACCT) 160 are pointed by the pointer 4 stored in the detail information area.

The send job account table (SACCT) 155 stores therein account information when the execution of a job is requested from the center site under consideration to a site corresponding to the entry. The stored account information includes the number 5 of jobs requested or sent from the center site under consideration, the quantities of use of computer system resources including the unit price 6 of use of central processing unit (hereinafter sometimes abbreviated as CPU) and the amount 7 of use of CPU, the amount 9 of data passed and the unit price 8 of passage when data is relayed to another site in the network system, and the total 10 of expenses associated with the request of job execution. The quantity or amount of use of each resource and the total of expenses are cumulative total values.

Similarly, the receive job account table (RACCT) 160 stores therein account information when the center site under consideration accepts or receives the execution of a job from a site corresponding to the entry. The stored account information includes the number 11 of jobs received, the quantities of use of computer system resources including the unit price 12 of use of central processing unit (CPU) of the center site under consideration and the amount 13 of use of CPU, the amount 15 of data passed and the unit price 14 of passage when data is relayed to another site in the network system, and the total 16 of expenses associated with the reception of job execution. The quantity or amount of use of each resource and the total of expenses stored in the receive job account table (RACCT) 160 are cumulative total values, like those in the send job account table (SACCT) 155. The unit prices stored in the send job account table (SACCT) 155 and the receive job account table (RACCT) 160 may be equal to each other or different from each other.

The user account table (USERT) 165 stores therein account information of users of the center site under consideration. The stored account information includes a user name 17, the amount (or time) 18 of use of CPU (CPUT), the number 19 of times of use of input/output device (IOC), the amount 20 of use of file capacity (FS), and so on. The amount 18 of use of CPU (CPUT), the number 19 of times of use of input/output device (IOC) and the amount 20 of use of file capacity (FS) correspond to the amount 7 or 13 of use of CPU, the number of use of I/0 and the amount of use of file capacity stored in the send job account table (SACCT) 155 or the receive job account table (RACCT) 160, respectively. The user account table (USERT) 165 may include an account item peculiar to each site in addition to the above-mentioned account items. In the user name field 17 of the user account table (USERT) 165, the name of a representative user of another site is registered as representative identification information.

The site status table (SITE-ST) 170 shown in FIG. 2 is a control table indicating the status of the center site under consideration in the network system. The site status table (SITE-ST) 170 includes status indicators (or identifiers) REQ 21, ST 22, NJ 23 and NSEQ 24. The REQ 21 is a parameter for transfer from the job management program 206 to the send/receive and account processing program 120 according to the present invention. The case where the value of the REQ 21 takes "ON" means the reception of a job from another site. The ST 22 is an indicator indicating the condition of crowdness of the center site under consideration. The ST 22 is established by the OS 205 and the job management program 206 and the reference thereto is made by the send/receive and account processing program 120 shown in FIG. 1. The case where the value of the ST 22 takes "BUSY" means that the center site under consideration is crowded. The NJ 23 is a work area of the send/receive and account processing program 120 and is used in the flow charts shown in and after FIG. 10. The NSEQ 24 is a parameter for transfer from the job management program 206 to the send/receive and account processing program 206 according to the present invention, like the REQ 21, and designates a way of processing. The possible values of the NSEQ 24 and the contents corresponding thereto are as follows:

"EX"—execution of job
"OUT"—outputting of execution result
"CNT"—relay of data
"ACT"—totalization of accounts.

The condition of crowdness of the center site under consideration may be detected in various ways. For example, there is a method, as disclosed by JP-A-61-253572, in which the activity ratio of a CPU, the activity ratio of a main memory and/or the activity ratio of an input/output device are continually measured and these (or this) are used as the loaded condition of a computer system. If the condition of crowdness of the computer system is proportionally calculated by use of the loaded condition, the higher the loaded condition, the value of the ST 22 becomes "BUSY".

FIG. 3 represents the format of a data stream 25 for inquiry about a request for job execution. The shown format of the data stream 25 includes a flag 25A to be set to the value of "F", a reference site name 25B, a requester (or sender) site name 25D and the contents 25D of request. The contents 25D of request include a field 25D1 representative of the kind of a machine, a field 25D2 representative of a predicted CPU time (CPUT) for the pertinent job, a field 25D3 representative of the capacity of a file to be used and a field 25D4 representative of a desired turn around time (TAT).

FIG. 4A represents the format of a data stream 26 for a response of non-acceptance of receive to the data stream 25 for inquiry about the request for job execution and FIG. 4B represents the format of a data stream 27 for response of acceptance of receive. In the case of the data stream 26 for response of non-acceptance of receive, the value of a flag 26A is set to "E". A field 26D1 of reason information 26D is provided with information of the reason why the turn around time (TAT) cannot be ensured when this is a reason for non-acceptance and a field 26D2 is provided with information of the reason why the CPU time (CPUT) cannot be ensured when this is a reason for nonacceptance. On the other hand, in the case of the data stream 27 for response of acceptance of receive, the value of a flag "27A" is set to "D" and fields 27D1, 27D2, 27D3,—of acceptance information 27D are provided with the contents of acceptance to be returned.

FIG. 5 shows the format of a data stream 28 upon request for job execution. The data stream 28 is delivered onto the network system with the value of a flag 28A being set to "0". The data stream 28 is composed of an executor site name field 28B representative of the name of a site which is to execute the job, a result outputting site name field 28C representative of the name of a site from which the result of job execution is to be outputted, a job requester site name field 28D representative of the name of a site which requests the execution of the job, a passage information field 28E and a job control language, program/data storage field 28F. In the result outputting site name field 28C is stored the name of a site which is to output the result of job execution when it is desired to output the result of job execution from a site other than the job requester site. The passage information field 28E is used for storage of account information at a site which relays data. In the job requester site name field 28D are stored a user name together with the site name.

FIG. 6 represents the format of a data stream 29 when the outputting of the result of job execution finished is made by a site other than the requester site and the executor site. In the case where the outputting of the result of job execution is made by the requester site or the executor site, no site name is stored in a result outputting site name field 28C of the data stream 29. The value of a flag 29A of the job execution finish data stream 29 is set to "1" and account information are stored in a job account information field 29E and a passage information field 29E. A data stream for the result of job execution is stored in a job execution result field 29F.

FIG. 7 represents the format of a data stream 30 when account information is returned to the job execution requester site after both the execution of the job and the outputting of the result have been finished. The value of a flag 30A of the data stream 30 is set to "2" and account information are stored in a job account information field 30B, a result output account information field 30C and a passage information field 30D. Thus, the data streams 29 and 30 shown in FIG. 6 and 7 hold account information. The requester site performs a processing for the settlement of accounts in the network system.

FIG. 8 represents the format of a data stream 31 when the result of the settlement of accounts between sites is exchanged between for every constant period. The value of a flag 31A of the data stream 31 is set to "3". The data stream 31 is composed of a pertinent site name field 31B, a send job account information field 31B and a receive job account information field 31D. The field 31C stores therein the number 31C1 of jobs sent, the frequencies 31C2 to 31C5 of use of resources, and expenses (or account) 31C6. Similarly, the field 31D stores therein the number 31D1 of jobs received, the frequencies 31D2 to 31D5 of use of resources, and expenses (or account) 31D6. The frequencies 31C2 to 31C5 and 31D2 to 31D5 or resources and the account 31D6 include the times CPUT (31C2) and CPUT-R (31D2) of use of central processing unit (CPU), the numbers IOC (31C3) and IOC-R (31D3) of times of use of input/output device, the numbers LPC (31C5) and LPC-R (31D5) of result output pages, and so on. These items may be different between sites.

FIG. 9 is a block diagram illustrating a program structure of the send/receive and account processing program 120 shown in FIG. 1. The send/receive and account processing program 120 includes a network job main processing 175, a job transfer processing 180, a job execution processing 182, an execution result output processing 183, a job transfer relay processing 186 and a network job account processing 188. FIGS. 10 to 16 show the respective flow charts of the processing programs in the program structure shown in FIG. 9. FIG. 17 is a flow chart of the account totalization processing program 110 shown in FIG. 1.

Next, explanation will be made of the details of the operation based on the computer system control method according to the present invention. First, the operation for a request for job execution will be explained. Referring to FIGS. 1 to 9, if a user makes the offer of a request for the execution of a job to the A center site 200, the job management program 206 of the A center site receives the job and thereafter the control is trnasferred to the send/receive and account processing program 120. The network job main processing 175 in the send/receive and account, processing program 120 having a program structure shown in FIG. 9 is entrusted with the control. The site status table (SITE-ST) 170 shown in FIG. 2 is also shown in FIG. 9. The site status table (SITE-ST) table 170 is data the reference to/updating of which is commonly made by the program group 120. In fields of the SITE-ST 170, a REQ 21 is an identifier of a request to the A center site (hereinafter referred to site under consideration) or another site, an ST 22 an identifier of the condition of crowdness, an NJ 23 an identifier of the stage of processing, and an NSEQ 24 an identifier of the condition of execution. The reference/updating are indicated by arrows shown by dotted lines. As shown by a processing flow of FIG. 10, the network job main processing 175 first examines in a processing step 36a whether or not the request from the job management program 206 is the totalization of accounts. If the value of NSEQ of the SITE-ST 170 is not "ACT", the processing flow proceeds to a processing step 36b since the request is not the totalization of accounts. In the processing step 36b, the examination is made of whether or not the request is one from another site. The value of the REQ 21 of the SITE-ST 170 takes "ON" in the case of the request from the other site and "OFF" in the case where the request from its own site to another site is tried. When the value of REQ is "OFF", the processing flow proceeds to a processing step 36c.

In the processing step 36c, the examination is made of whether or not the computer system of the site under consideration is crowded. If the value of the ST 22 is not "BUSY", this means that the computer system has a processing capacity in reserve. In the case, the control is returned to the job management program 206 so that the relevant job is executed by the computer system of the site under consideration. On the other hand, if the value of the ST 22 is "BUSY", a trial of a request for job execution to another site is made. This processing is performed by the job transfer processing 180. After this processing, if the job transfer processing 180 could make the request for job execution to the other site (normal return), the control is transferred to the job management program 206. To the contrary, if the job transfer processing could not make the request for job execution to the other site (error return), a processing step 36d is performed. In the processing step 36d, in order to execute the relevant job by the computer system of the site under consideration, the job stream of the user is returned again into the spool file and the control is thereafter returned to the job management program 206.

FIG. 11 is a processing flow of the job transfer processing 180 shown in FIG. 9. In this processing, the network statistical management table (NST) 150 is searched so that a request for job execution to sites other than the site under consideration is made starting from a site which has the worst balance of accounts relative to the site under consideration (that, is, a site for which the balance of accounts of the site under consideration has the greatest value). The request is made in order of unfavorableness of the balance of accounts relative to the site under consideration. This search processing corresponds to processing steps 40a to 40i. In a processing step 40g, a data stream for inquiry about a request for job execution as shown in FIG. 3 is delivered onto the network system. A response from the selected site is examined in a judgement processing step 40h. If the response is a data stream for response of acceptance of receive as shown in FIG. 4b, a processing step 41a is performed so that a data stream 28 as shown in FIG. 5 is produced and delivered onto the network system. This case corrresponds to the normal return.

On the other hand, if the response is a data stream 26 for response of non-acceptance of receive as shown in FIG. 4a, the flow proceeds to a judgement step 40i which judges whether or not a search based on the profit and loss of the balance for accounts is being conducted. If the search is being conducted, the flow is returned to a processing step 40e. If the search is not being made, the flow proceeds to a judgment processing step 41b. The judgement processing step 41b is a processing for making the inquiry to each site in order of registration into the network statistical management table (NST) 150 shown in FIG. 2. Processing steps 41g to 41g and the processing step 40g are a series of processing steps. If the search of all the entries is made by a judgement processing step 41f, there results in the error return.

In this manner, the job of the user of the center site under consideration has executed by another center site in the network system. When the execution of the job by the other site is finished, a data stream 29 or 30 as shown in FIG. 6 or 7 is returned. When the job management program 206 receives this data stream, it examines the format of the data stream. In the case where the data stream takes the format shown in FIG. 6 and the outputting of the result is to be made by the center site under consideration, the job management program 206 causes data of the job execution result 29F to be stored into the spool file 201 and thereafter sets the value of the NSEQ 24 to "ACT", and the control is transferred to the network job main processing 175. On the other hand, in the case where the data stream takes the format shown in FIG. 7, the job management program 206 immediately sets the value of the NSEQ 24 to "ACT" since the outputting of the result of job execution is made by another center site, and the control is transferred to the network job main processing 175.

The network job main processing 175 shown in FIGS. 9 and 10 recognizes that the request from the job management program 206 is an account processing and transfers the control to the account processing 188. FIG. 16 is a flow chart of the account processing 188. Referring to FIG. 16, processing steps 50a to 50c are performed if the value of the NSEQ 24 is "ACT".

In a processing step 50a, account information is taken out of the data stream 29 or 30 shown in FIGS. 6 and 7. The account information include
  (1) job execution account information 29B, 30B,
  (2) result output account information 29C, 30C,
  (3) passage information account information 29E, 30D, and so on. These information is cumulatively added into the entry of the send job account table (SACCT) 155 corresponding to a site name, for example, an executor site 29B1. More particularly, in the case of the CPU time, the value of the CPUT 29B2 is added to the value of the amount 9 of use of CPU and the result of addition is again stored into the area of the amount 7 of use of CPU. A similar processing is made for other items. In this time, the value of the field 5 representative of the number of jobs received is incremented by +1. The passage information account caused by the passage through other sites is cumulatively added to the amount 9 of data passed in regard to only the accounts demanded from the other sites (site 30D1, site 30D2, and so on).

In a processing step 50b, a processing of casting accounts for the user under contract with the center site under consideration is performed. First, the site name 29B1 or 30B1 are acquired from the data stream and the characteristic field 2 is acquired from the corresponding entry of the network statistical management table (NST) 150 shown in FIG. 2. In the characteristic ,field 2 is stored information of characteristics which include the speed of CPU, the system structure, and so on. A method of correction of accounts for the user may include
  (1) correction based on difference between CPU speeds,
  (2) correction based on difference between unit prices of processing,
  (3) no correction, and so on. The administrator can determine the correction method in accordance with his operating policy. However, at least the way (1) of correction is necessary. In the present embodiment, the ways (1) and (2) of correction will be explained. In the way (1) of correction based on the difference between CPU speeds, the CPU speed of the other site is acquired from the characteristic field 5 to calculate the processing speed ratio thereof to the CPU speed of the site under consideration. The value of the CPUT 29B2 or 30B2 multiplied by the calculated processing speed ratio is cumulatively added to the CPUT 18. When viewed from the user, this processing may be equivalent to the processing by the computer system of the site under consideration with which the user is under contract. In the way (2) of correction based on the difference between unit prices of processing, the ratio of the unit price of processing at the site under consideration to the unit price of processing at the other site is calculated and the amount of processing 29B2 or 29B3 is multiplied by the calculated ratio. In general, it is not preferable to make the correction based on the way (1) for the CPUT 29B2, the correction for the number 29B2 of times of use of I/O device (IOC) and the correction for the amount 29B4 of use of file capacity (FS). Also, it is not preferable to make the account associated with the amount 29E or 30D of data passed to the user. This is because the accounts of those items are caused by the execution of a job at the other site owing to circumstances at the site under consideration and hence it is not preferable to charge the balance or difference of accounts to the user.

The above-mentioned charging method for the rent depends upon the judgment of the administrator of each site.

In a step 50c of FIG. 16 performs a processing for the settlement of accounts between the center site under consideration and a job execution requesting site. This processing is performed for all sites which appear in the data stream 29 or 30 as shown in FIG. 6 or 7. First, the unit price of processing and the amount of use or the number of times use in the SACCT 155 shown in FIG. 2 are multiplied by each other to modify the total 10 of expenses for request. Next, the total 10 of expenses for request is subtracted from the total 16 of expenses for processing or reception in the RACCT 160 and the result of subtraction is stored into the balance field 3 of the NST 150 corresponding to the relevant site. Accordingly, if the value of the balance field 3 is plus, the center site under consideration is at a profit as compared with the relevant site, and it is possible to make a further request for job execution to the relevant site.

The foregoing explanation has been made of the control method when the execution of a job is requested from a given center site to another center site, the method of processing account information attendant upon the request of job execution and the method for the settlement processing of accounts between sites. Next, explanation will be made of a control method upon reception of job execution from another center site.

Referring to FIGS. 9 and 10 and FIGS. 3 to 8, a data stream 25 for inquiry about a request for job execution, as shown in FIG. 3, is sent to a given center site (hereinafter referred to as center site under consideration) from another center site. When detecting this data stream 25, the job management program 206 transfers the control to the network job main processing 175. At this time, the value of the REQ 21 in the site status table (SITE-ST) 170 is "ON" and the value of the NJ 23 is "2".

Since the value of the REQ 21 is "ON", the network job main processing 175 performs processing steps 42a to 42g shown in FIG. 10, and the job execution processing 182 and the execution result output processing 183 operate. After the above-mentioned processing steps 36a and 36b have been performed, the flow proceeds to a processing judgment step 42a. Since the stage of processing is the inquiry from the other site (NJ=0), the flow proceeds to the next judgment step 42b. In the judgment processing step 42b, the condition of crowdness of the center site under consideration is examined, that is, whether or not the value of the indicator ST 22 in the SITE-ST 170 is "BUSY" is examined. If the result of examination determines that the value of the indicator ST 22 is "BUSY", a processing step 42c is performed. In the processing step 42c, a data stream 26 for response of non-acceptance of receive as shown in FIG. 4a is produced and delivered. At this time, the values are set to the answer site name field 26B and the reason information field 26D. On the other hand, if the value of the indicator ST 22 is not "BUSY", processing steps 42d and 42e are performed to provide for the acceptance of a job. Namely, in the processing step 42d, a data stream 27 for response of acceptance of receive as shown in FIG. 4b is produced and delivered. In the processing step 42e, the value of the NJ 23 is set to "1" and thereafter the control is once returned to the job management program 206.

In this manner, the answer to the inquiry about the request for job execution has been made to the other center site. Next, a data stream 28 or 29 as shown in FIG. 5 or 6 is sent from the other center site. When receiving the data stream 27 or 28, the job management program 206 sets the value of the NSEQ 24 to "EX" or "execution of job" if the executor site name 28B is equivalent to the name of the site under consideration. If the result outputting site name 29C is equivalent to the name of the site under consideration, the job management program 206 sets the value of the NSEQ to "OUT" and transfers the control to the network job main processing 175. In the case where both the executor site name and the result outputting site name designate the site under consideration, the setting to "EX" takes the precedence of the setting to "OUT".

The network job main processing 175 performs processing steps 42f and 42g shown in FIG. 10 and thereafter transfers the control to the job execution processing 182 or the execution result output processing 183. In the processing step 42f, the value of the NJ 23 is set to "2" in order to indicate that the relevant job is a job of the network system (or a network job). The job execution processing 182 is composed of two processing programs 182a and 182b upon start of job execution and upon finish of job execution. FIG. 12 is a flow of a processing performed upon start of job execution and FIG. 13 is a flow chart performed upon finish of job execution.

Referring to FIG. 12, a portion 182a of the job execution processing 182 to be performed upon start of job execution includes processing steps 43a to 43c. In the processing step 43a, the data stream 28 shown in FIG. 5 is decomposed. In the processing step 43b, representative identification is added. The step 43b is performed for an account processing in the center site under consideration. Next, in the processing step 43c, the job control language, program and data are stored into the spool file so that the job is executed by the computer system in the center site under consideration itself. Here, the control is one returned to the job management program 260. In this manner, the job of a user of the other center site is executed by the computer system in the center site under consideration. Namely, the computer system in the center site under consideration sequentially performs a group of jobs stored in the spool file 201.

After the execution of the job has been finished, the job management program 206 sets the value of the NJ 23 to "2" since the relevant job is the job of the network system (or the network job), and the job management program 206 thereafter transfers the control to the job execution processing 182 again. Referring to FIG. 13 showing the flow chart of the portion 182b of the job execution processing 182 upon finish of job execution, in a processing step 44a, account information of the relevant job is stored into, the entry corresponding to the user name. In a judgment processing step 44b, whether or not the relevant job is a network job is judged. In the case where the relevant job is a network job, the flow proceeds to a processing step 44c. In the processing step 44c, the account information is cumulatively added into the receive job account table (RACCT) 160. At this time, the value of the number 11 of jobs received is incremented by +1. Also, the total 16 of expenses for processing or reception is calculated. In the case where the relevant job is not a network job, that is, in the case where the job of the user of the center site under consideration with which the user is under contract is executed at that center site itself, the flow passes by the processing step 44c.

After the above processing has been finished, the control is returned to a processing step 42h of FIG. 10 in which the value of the NJ 23 is set to "0" and the control is thereafter transferred to the network job account totalization processing 188.

Next, explanation will be made of the operation when the value of the NSEQ 24 is "OUT" or the outputting of the result of job execution is made. In this case, the format of a data stream is as shown in FIG. 6 or the outputting of the result of job execution performed by another site is requested. Since the value of the NSEQ 24 takes "OUT" in the judgment processing step 42g, the network job main processing 175 shown in FIGS. 9 and 10 transfers the control to the execution result execution output processing 183. FIG. 14 shows a flow chart of the execution result output processing 183. In a judgment processing step 45a, whether or not the relevant job is a network job is checked. If the relevant job is not a network job, the flow proceeds to a processing step 45d. If the relevant job is a network job, the job execution result field 29F is taken out of the data stream shown in FIG. 6 and is outputted to the output device (step 45b). Next, in a processing step 45c, account information is cumulatively added to the number 13A of times of use of output device in the receive job account table (RACCT) 160. The value of the number 13A of times of use of output device may be the value of the number of output pages or output lines. At this time, the value of the number 11 of jobs received is incremented by +1. Also, the total 16 of expenses for processing or reception is calculated. In the processing step 45d, the account information of the relevant job is stored into the entry of the USERT 165 corresponding to the user name. After these consecutive processings have been finished, the flow is returned to the processing step 42h shown in FIG. 10. In a similar manner to the processing performed upon finish of job execution, in the processing step 42h, the value of the NJ 23 is set to "0" and the control is thereafter transferred to the network job account totalization processing 188.

FIG. 16 is the flow chart of the network job account totalization processing 188. The procedure when the value of the NSEQ 24 is "ACT" or the processing performed upon totalization of accounts has already been explained. Here, explanation will be made of the operations in processing steps 51a to 51d and a processing step 52a. The processing steps 51a and 51b are a processing for delivering a data stream upon demand for an account associated with the execution of a job when the value of the NSEQ 24 is "EX". In the processing step 51a, a data stream 29 or 30 as shown in FIG. 6 or 7 is completed. More particularly, the quantities of computer resources are stored into the job execution account field 29B or 30B, like the processing in which the account information is stored into the RACCT 160 at the portion of the job execution processing 182 upon finish of job execution (see FIG. 13). At this time, the name of the center site under consideration is stored into the executor site name field 29B1 or 30B1. The data stream shown in FIG. 6 corresponds to the case where the outputting of the result of job execution is made by another site. In the case where the outputting is to be made by the other site, the data 29F of the job execution result is added to the data stream 29 (step 51c). Thereafter, the data stream completed in the processing steps 51a and 51c is delivered onto the network system (step 51d).

On the other hand, when the value of the NSEQ 24 is "OUT", a data stream 30 shown in FIG. 7 is completed. In a processing step 52a, account information such as the number 30C2 of output pages is stored into the result output account information field 30C and a value is stored into the outputting site name 30C1. In the processing step 51d, the data stream completed in the processing step 52a is delivered onto the network system.

The above is the operations performed when the execution of a job or the outputting of the result of job execution is requested from another site. Next, the accounting associated with the relay of a data stream will be explained. If a mutual agreement is obtained between sites, it is not necessary to make the relay account. The relay accounting is a processing in which when a request for the execution of a job or the outputting of the result of job execution is made from the A center site to the C center site through the lines L1 and L2, the B center site makes a demand for an account associated with the relay of a data stream to the A center site which is a requester site. This processing is performed by the job transfer relay processing 186 and the network job account processing 188 shown in FIG. 9.

FIG. 15 shows a flow chart of the job transfer relay processing 186. When entrusted with the control by the job management program 206, the job transfer relay processing 186 causes the amount of data stream relayed to be stored into the region 15 for the amount of data passed in the RACCT 160 shown in FIG. 2 (see step 54a in FIG. 15). Thereafter, the control is transferred to the network job account processing 188. A processing for the relay account by the network job account processing 188 is performed in processing steps 53a and 51d shown in FIG. 16. Namely, in the processing step 53a, the amount of data passed is stored into the passage information field 29E or 30D of the data stream 29 or 30 shown in FIG. 6 or 7. More particularly, the amount of data passed is stored into the field (such as 30D1 or 30D2) corresponding the relaying site. Thereafter, in the processing step 52a, the data stream completed in the processing step 52a is delivered onto the network system.

The foregoing is the operation of the send/receive and account processing program 120 shown in FIG. 1. Next, the operation of the account totalization processing program 110 will be explained. FIG. 17 shows a flow chart of the account totalization processing program 110 and FIG. 8 shows a data stream when one of the pertinent center sites informs the other of the pertinent center sites of the result of the account totalization processing. Referring to FIG. 17, the network statistical management table (NST) 150 is located (step 56b) and the repeat counters are initialized (step 56b). Here, n is the value of the number 4a of networks in the NST 150 and i is an index for locating the entry of the NST 150. Processing steps 56c to 56i are repeated until the value of i exceeds n.

In the processing step 56c, the value of the index i is incremented by +1. In the processing step 56d, whether or not the value of i exceeds n is checked. When the value of i exceeds n or when a processing for the settlement of accounts for all of the entries of the NST 150 is finished, the contents of the BCT table group 100 are stored into the network file 202 (step 56j). The stored table group includes the NST 150, SACCT 155, RACCT 160 and USERT 165 shown in FIG. 2.

If the result of comparative check in the processing step 56d shows that the value of i does not exceed n, the processing steps 56e to 56i are repeated. In the processing step 56e, a processing for the settlement of accounts relative to a site registered in the i-th entry of the NST 150 is performed. Namely, the unit price and the frequency for each processing in the RACCT 160 are multiplied by each other to calculate the total 16 of expenses for processing or reception. Also, the unit price and the frequency for each processing in the SACCT 155 are multiplied by each other to calculate the total 10 of expenses for request. The total 10 of expenses for request is subtracted from the total 16 of expenses for processing to obtain the value of the balance 3. Further, in order to inform the pertinent center site of the result of settlement of accounts, a data stream 31 as shown in FIG. 8 is produced and delivered onto the network system. In FIG. 8, the send job account information 31C is the contents of the SACCT 155 and the receive job account information 31D is the contents of the RACCT 160. The data stream 31 includes the receiver site name 31BR and the sender site name 31BS. The receiver site name 31BR corresponds to the name of a site relative to which the settlement of accounts is to be made and the sender site name 31BS is the name of a site which informs the receiver site of the result of settlement of accounts.

In a judgment processing step 56g, the debit and the credit are compared or the balance of accounts for debit and credit is examined. If the debit and the credit are cancelled from each other, the flow is returned to the processing step 56c. If the balance of accounts for debit and credit of the sender site is plus, a processing step 56h is performed. In the processing step 56h, a document for demand for the difference to the receiver site is produced. On the other hand, the balance of accounts of the sender site is minus, a processing step 56i is performed. In contrast with the processing step 56h, the processing step 56i produces a document for payment of the difference to the receiver site. This processing may be interlocked with an automatic automated system for payment as in a bank. In the case where the index i exceeds the number n of networks, a processing step 56j is performed. In the processing step 56j, the contents of the BCT 100 are cumulatively stored into the network file 202.

According to the present invention, in a computer network system in which a plurality of computer systems managed by different managers are connected, each computer system site is allowed to cumulatively store account information from another site associated with a request for execution of a job to the other site and demand account information associated with the reception and execution of a job of the other site and is allowed to demand the rent to a user under contract with its own site in accordance with the standard for accounts at its own site. Accordingly, there is an effect that it is possible to provide a service to users in accordance with a fixed standard for accounts.

Also, in a computer network system in which a plurality of computer systems managed by different managers are connected, a request of the execution of a job from any given computer system site to another computer system site can be made in such a manner that a site having an unfavorable balance of accounts relative to the given site is preferentially selected as the site to which the execution of the relevant job is to be requested. Accordingly, there is an effect that it is possible to prevent an unequilibrium between accounts for debit and credit from arising between sites.

Further, when a certain site receives the execution of a job from another site, a computer system of the certain site can be used by virtue of only representative identification information of the other site requesting the execution of the job. Accordingly, there is an effect that there is no fear that the number of registrants of the computer system of any given site is not increased to an unlimited extent with requests for execution of jobs from other sites.

What is claimed is:

1. A control method for a computer network system in which a plurality of computer systems managed by different managers are connected, and wherein a user requests that a job be executed by a computer system in the network system, said method comprising in each of said computer systems:

a first step of requesting an execution of a job by a first of the computer systems to a second of the computer systems in said computer network system, wherein a first storage means of the first computer system stores scheduled account information of jobs for which the second computer system is being requested to execute, a second storage means of the first computer system stores resulting account information of jobs received from the second computer system and executed by the first computer system, and third storage means stores user account information of users for computer systems in the network;

a second step of receiving from the second computer system resulting account information together with the execution of the job;

a third step of adding the resulting account information acquired in said second step to the scheduled account information in said first storage means and storing result of the adding into said first storage means and settling of accounts between the first and second computer systems on a basis of the added account information in said first storage means and the resulting account information in said second storage means; and a fourth step of charging the user under contract with the first computer system on the basis of the resulting account information added to said first storage means and a cost standard of the first computer system for accounts, whereby the job of the user is charged as if executed by the first computer system even when executed by the second computer system in said computer network system.

2. A control method for a computer network system in which a plurality of computer systems managed by different managers are connected, said method comprising in each of said computer systems:

a first step of storing scheduled account information of jobs requested from a first computer system to be executed by selected other computer systems, into a first storage means in correspondence to the computer systems in said computer network system;

a second step of storing resulting account information of the requested jobs received and executed by the other computer system into a second storage means of the first computer system in correspondence to the computer systems in said computer network system;

a third step of storing user account information of users of the first and the other computer systems and information of users of said computer network system into third storage means;

a fourth step of executing a job in the first computer system when the execution of the job is requested from any one of the plurality of computer systems in said computer network system;

a fifth step of storing the resulting account information associated with the execution of the job in said fourth step into said second or third storage means; and a sixth step of transferring the executed job and the resulting account information of the job to a designated computer system.

3. A control method for a computer network system in which a plurality of computer systems managed by different managers are connected, in which when a request for an execution of a job is made from a first computer system to a second computer system through a third computer system in said computer network system, said third computer system has a step of making a demand for an account associated with a relay of passed data to said first computer system.

4. The control means according to claim 1, wherein the resulting account information stored in said first and second storage means includes a unit price of processing, a frequency of processing and a total of rent.

5. The control method according to claim 1, wherein in said first step, the first computer system is disposed at a job requesting site and transfers information inclusive of identification information of the job requesting site, identification of a job executing site and a contents of request and a data stream of job control language, program and data of the job together with a storage area of scheduled account information added thereto to the second computer system of the job executing site.

6. The control method according to claim 5, wherein said storage area of scheduled account information can store therein resulting account information associated with the execution of a job including account information associated with the outputting of the result of execution of a job, and account information associated with relay of data.

7. The control method according to claim 1, wherein in said second step, identification information and resulting account information of the job executing site, identification information and resulting account information of the job execution result outputting site, and identification information of a site relaying data passed and resulting account information associated with the relay of data passed are received together with the executed job.

8. The control method according to claim 1 wherein said third step includes a step of making the settlement of accounts on the basis of a total expenses for requesting stored in said first storage means and a total of expenses for reception stored in said second storage means and a step of storing a result of settlement of account therebetween into fourth storage means.

9. The control method according to claim 1, wherein said fourth step calculates a rent of computer use on a basis of a frequency of processing and a unit price of processing at the second computer system of the job requesting site among the resulting account information acquired in said second step.

10. The control method according to claim 3, wherein in the making of the demand for the account associated with the relay of passed data, the amount of passed data is stored into storage means in which resulting account information associated with the relay of passed data is stored.

11. The control method according to claim 1, wherein when the first computer system requests the execution of a job to other sites, a one of the other sites is selected taking an equilibrium in balance of accounts for debit and credit between the job requesting site and each of the other sites into consideration.

12. The control method according to claim 11, wherein in selecting one of the other sites, a site having a worst balance of accounts relative to the job requesting site is selected and in the case where the site having the worst balance cannot accept the job, a processing of selecting a site having a next worst balance of accounts relative to the job requesting site is made.

13. The control method according to claim 9, wherein the calculation of the rent of computer includes multiplying the frequency of processing included in the resulting account information acquired in said second step by the ratio of the processing speed of the computer of the job executing site to the processing speed of the computer of the job requesting site and multiplying the result of multiplication by the unit price or processing at the job requesting site to provide a portion of the rent.

14. The control method for a computer network system in which a plurality of computer systems managed by different managers are connected, in which when each of said computer systems requests an execution of a job to another site in said computer network system, the each computer system makes the step of utilizing representative user identification information of its own site for the other site.

15. The control method according to claim 1, wherein when as the result of the settlement of accounts by said third step, an unequilibrium in the balance of accounts is present between the first and second computer systems, the payment of a difference is made between the sites.

16. The control method according to claim 1, wherein the result of settling of accounts by said third step is communicated to the second computer system through said computer network system.

17. A control method for a computer network system in which a plurality of computer systems managed by different managers are connected, in which an execution of a job and an outputting of a result of execution of said job is performed by selectively assigning the job from a first computer system to a second computer system in said computer network system based upon an equilibrium of jobs between the first and second computer systems.

18. The control method according to claim 17, including outputting of the result of execution of the job in such a manner that the result of execution of the job is delivered together with site identification information.

19. A control method for a computer network system in which a plurality of computer systems managed by different managers are connected, in which each of said computer systems examines a loaded condition of that computer system itself when a request for the execution of a job is made by a user under contract with that computer system comprising selectively requesting an execution of the job to another computer system in said computer network system when the result of the examination shows that a load is high, that is, said that computer system is busy and the other computer system can execute the job.

20. The control method according to claim 1, wherein when the first computer system requests the execution of the job to the second computer system in said computer network system, the first computer system inquires of the second computer system about whether or not the second computer system is capable of executing the job and then requires the execution of the job after having obtained a response of acceptance from the second computer system as a result of inquiry.

21. The control method according to claim 20, wherein upon the inquiry about the capability of reception of the execution of the job, a data stream including a name of job executing site, a name of job requesting site and a contents of the job to be requested is delivered onto said computer network system.

22. The control method according to claim 21, wherein the contents of the job to be requested in said data stream include information concerning a predicted time of use of a central processing unit and a predicted amount of use of file capacity for the job.

23. The control method according to claim 1, wherein when a site of first computer system in said computer network system delivers a data stream for inquiry about a request for the execution of a job to a site of the second computer system in said computer network system and said second computer system receives said data stream for inquiry, the site of said second computer system judges a condition of crowdedness of the site of the second computer system to deliver a response of acceptance of reception of the execution of the job to the site of said first computer system if said second computer system can afford to execute the requested job and a response of rejection of reception of the execution of the job to the site of said first computer system if said second computer system cannot afford to execute the requested job.

24. The control method according to claim 23, wherein the delivery of said response is made in such a manner that a data stream including a name of a response delivering site and a name of the requesting site is delivered onto said computer network system.

25. The control method according to claim 16, wherein upon communication of the result of settlement of accounts to a site of the second computer system, a data stream including a name of a receiver site, a name of a sender site, sent job account information and receive job account information is delivered onto said computer network system.

26. The control method according to claim 2, wherein the account information stored in said first and second storage means includes a unit price of processing, a frequency of processing and a total of rent.

27. A control method for a computer network system in which a plurality of computer systems managed by different managers are connected, in which each computer system in said computer network system is provided with a group of tables for storing characteristics of other computer system sites in said computer network system with which each other computer system is communicable, comprising storing a cumulative total of scheduled account information when the site of a first computer system requests an execution of jobs to another site, a cumulative total of resulting account information when the site of the first computer system executes jobs requested from the other site, and a calculated value of a balance of accounts between the site of the first computer system and each other site in correspondence to each of all the sties in said computer network system, and when the site of the first computer system requests the execution of a job to one of the other sites, examining the calculated value of the balance of accounts by the first computer system between the site of the first computer system and each of the other sites so that a site to which the execution of the job is to be requested is selected on a basis of a balance of accounts between the site of the first computer system and the other site.

28. A control apparatus for a computer network system in which a plurality of computer systems managed by different managers are connected, said apparatus comprising in each of said computer systems:
   first storage means for storing scheduled account information of jobs for other computer systems that can be requested in correspondence to a first computer system in said computer network system;
   second storage means for storing resulting account information of jobs received and executed by the first computer system in correspondence to the other computer systems in said computer network system;
   third storage means for storing account information of users of the first computer system;
   first control means for requesting an execution of a job to a one of the other computer systems in said computer network system;
   second control means for receiving the resulting account information together with a result of execution of the job from the other computer system to which the first computer system requests the execution of the job;
   third control means for adding the resulting account information acquired by said second control means to a value of the scheduled account information stored in said first storage means and storing the result of addition into said first storage means again;
   fourth control means for settling accounts on the basis of the added account information in said first storage means and the resulting account information in said second storage means; and
   fifth control means for demanding an account to a user under contract with the first computer system on a basis of the added account information stored in said first storage means and a standard of the first computer system for accounts even if a job of the user is executed by another computer system in said computer network system.

29. A control apparatus for a computer network system in which a plurality of computer systems managed by different managers are connected, said apparatus comprising in each of said computer systems:

first storage means for storing scheduled account information of jobs requested in correspondence to other computer systems in said computer network system;

second storage means for storing resulting account information of jobs received and executed by another computer system in correspondence to a first computer system in said computer network system;

third storage means for storing information of users in the first computer system and users of the other computer systems in said computer network system;

first control means for selectively making the first computer system execute a job in the first computer system itself when the execution of the job is requested by any one of the other computer systems in said computer network system;

second control means for causing resulting account information associated with the execution of the job to be stored into said second and third storage means; and third control means for transferring the result of execution of the job and the resulting account information of the job to a designated computer system.

* * * * *

UNITED STATES PATENT AND TRADEMARK OFFICE
CERTIFICATE OF CORRECTION

PATENT NO. : 5,202,989

DATED : April 13, 1993

INVENTOR(S) : Toshio Hirosawa, et al.

It is certified that error appears in the above-identified patent and that said Letters Patent is hereby corrected as shown below:

Claim 27, column 24, line 22, delete "sties" and substitute therefor --sites--.

Signed and Sealed this

Thirtieth Day of November, 1993

Attest:

BRUCE LEHMAN

Attesting Officer

Commissioner of Patents and Trademarks